United States Patent [19]

Itoh et al.

[11] Patent Number: 6,084,728

[45] Date of Patent: *Jul. 4, 2000

[54] METHOD OF RECORDING MAGNETIC INFORMATION

[75] Inventors: Takeyoshi Itoh; Naoshi Sugiyama, both of Asaka, Japan

[73] Assignee: Fuji Photo Film Co., Ltd., Kanagawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/513,563

[22] Filed: Aug. 10, 1995

[30] Foreign Application Priority Data

Aug. 18, 1994 [JP] Japan ................................. 6-194274
Sep. 13, 1994 [JP] Japan ................................. 6-218873

[51] Int. Cl.$^7$ ............................................... G03B 31/00
[52] U.S. Cl. ............................................... 360/3; 360/48
[58] Field of Search ........................ 360/2, 3, 53, 1, 360/48, 49; 354/105, 106

[56] References Cited

U.S. PATENT DOCUMENTS

| | | |
|---|---|---|
| 4,878,075 | 10/1989 | Cannon . |
| 4,933,773 | 6/1990 | Shiota et al. ............................. 358/302 |
| 5,194,892 | 3/1993 | Robison .................................. 355/40 |
| 5,309,242 | 5/1994 | Asami et al. ............................ 355/45 |
| 5,344,730 | 9/1994 | Kitamoto ................................ 354/106 |
| 5,347,403 | 9/1994 | Uekusa .................................. 354/105 X |
| 5,379,433 | 1/1995 | Yamagishi ............................. 360/60 X |
| 5,455,648 | 10/1995 | Kazami ................................ 354/106 |
| 5,461,440 | 10/1995 | Toyoda et al. ....................... 354/106 |
| 5,541,644 | 7/1996 | Nanba ................................. 360/3 X |
| 5,790,330 | 8/1998 | Sugiyama ............................ 360/1 |

FOREIGN PATENT DOCUMENTS

| | | |
|---|---|---|
| 5-75922 | 3/1993 | Japan . |
| WO9004301 | 4/1990 | WIPO . |

*Primary Examiner*—Paul Loomis
*Assistant Examiner*—K. Wong

[57] ABSTRACT

A magnetic track on a roll of photographic film is divided into a leader track on the forward end part of the film and a frame track corresponding to each frame, which is located after the ladder part. A manufacturer identification code including the manufacturer code which is peculiar to the manufacturer, a function selection code indicating a specific function and the like is recorded in the leader track. In each frame track, magnetic information is stored which is determined by the manufacturer identification code, the function selection code and the like. Furthermore, a film image on a roll of developed film is read out, then an image of one or plural frames is displayed on a TV monitor. Users enter the above described magnetic information while looking at a display screen of the TV monitor so that magnetic information relating to a printing can be recorded easily and without mistakes.

25 Claims, 12 Drawing Sheets

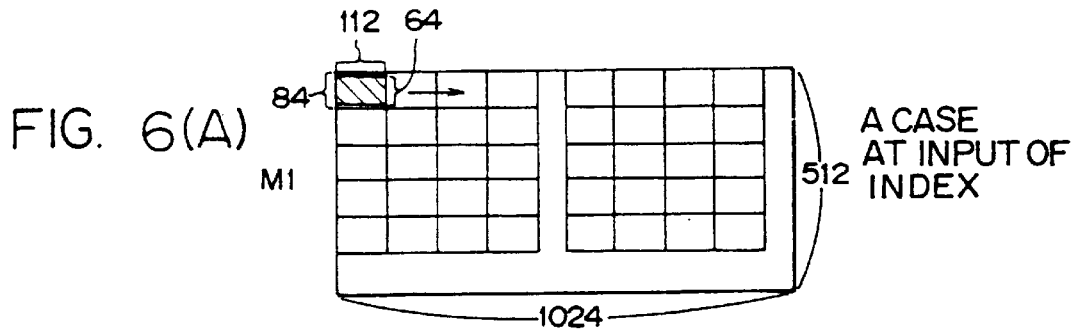
FIG. 6(A) — A CASE AT INPUT OF INDEX
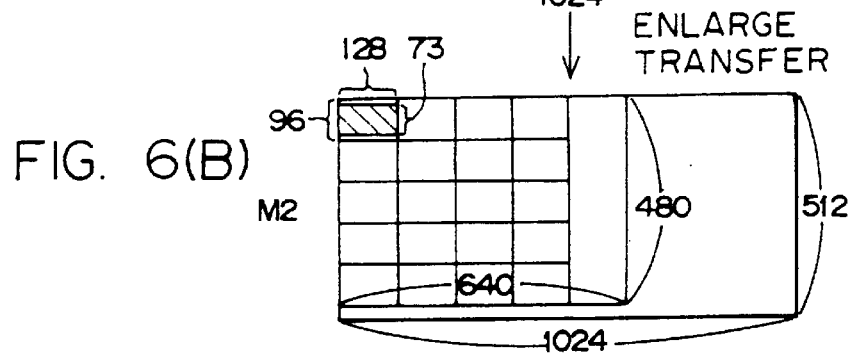
FIG. 6(B) — ENLARGE TRANSFER
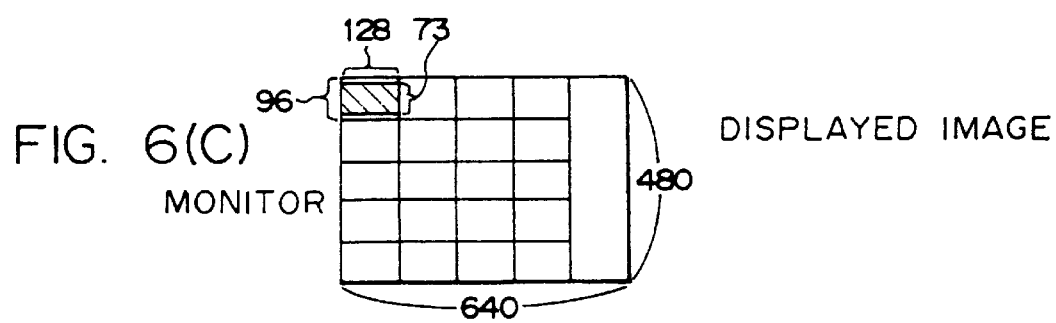
FIG. 6(C) — DISPLAYED IMAGE / MONITOR
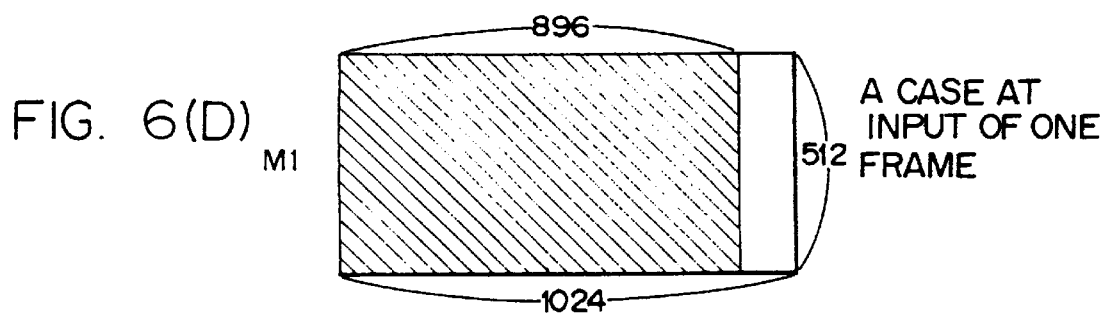
FIG. 6(D) — A CASE AT INPUT OF ONE FRAME

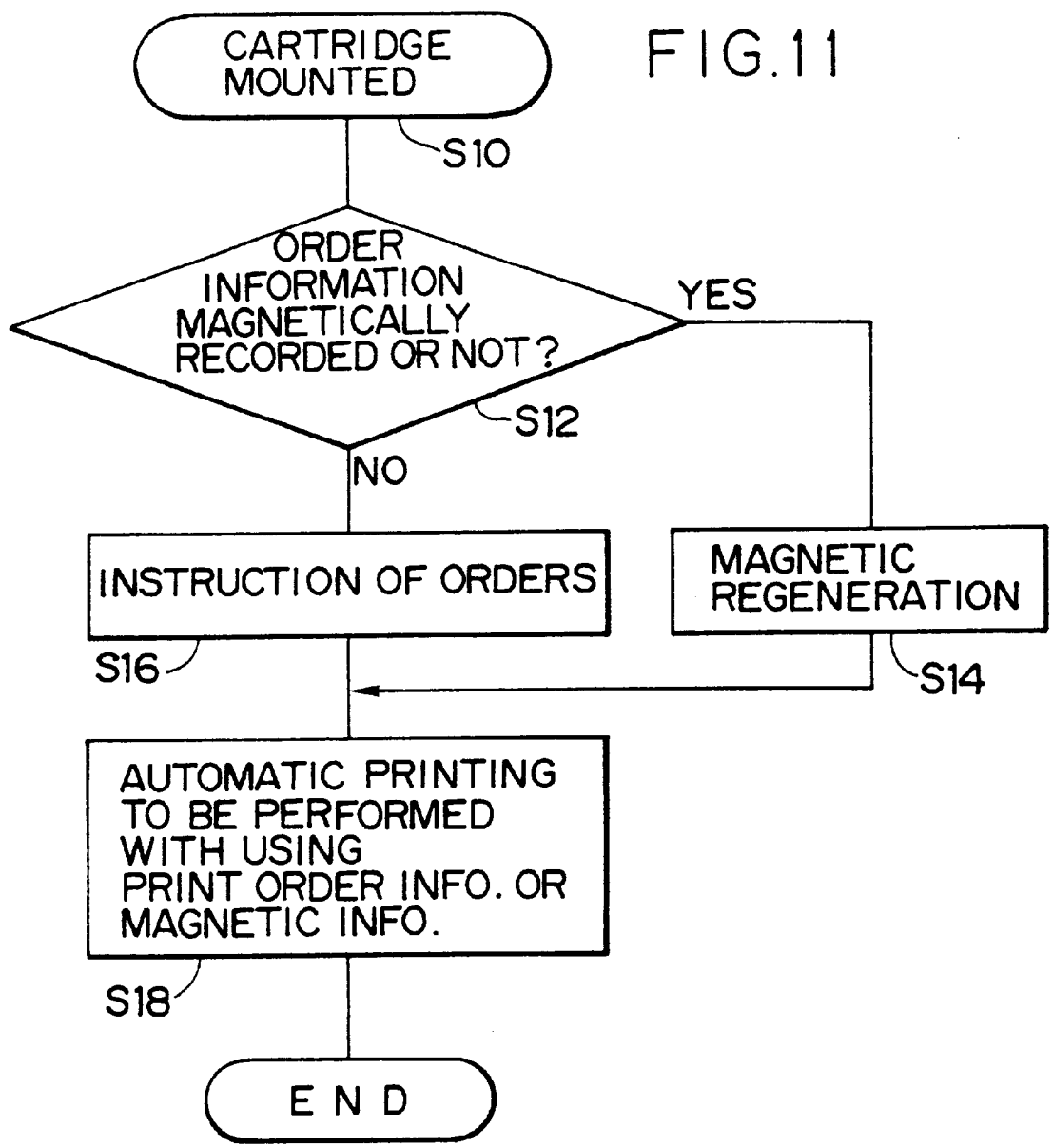

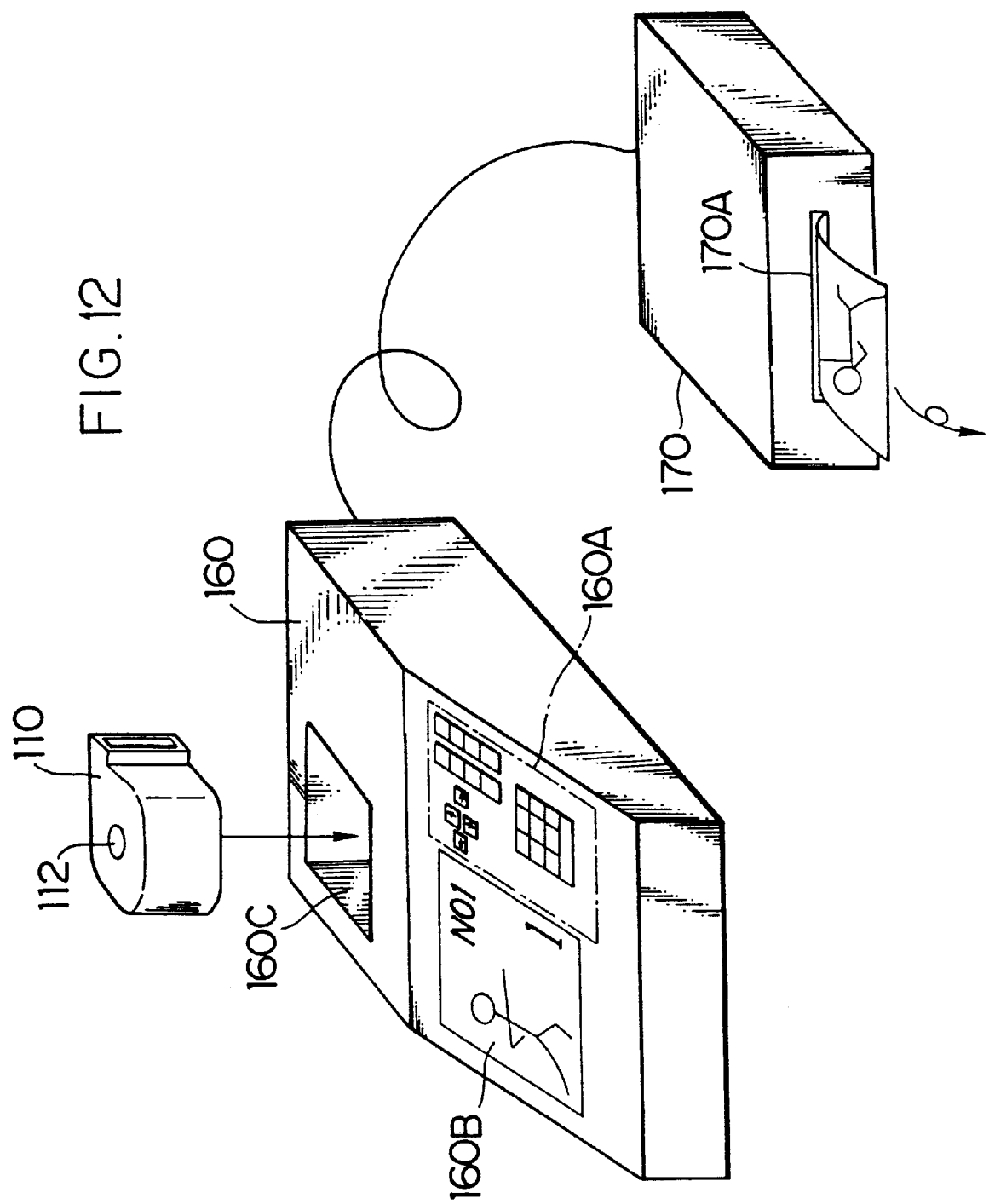

METHOD OF RECORDING MAGNETIC INFORMATION

BACKGROUND OF THE INVENTION

1. Field of the Invention

The present invention relates to a method of recording magnetic information and more particularly to a method of recording magnetic information, where the magnetic information is recorded in a magnetic track on a roll of photographic film.

2. Description of the Related Art

There is a conventional camera in which a transparent magnetic substance coats a photographic film so that a magnetic layer is formed and which records photographic data in a predetermined magnetic track in a magnetic layer when photographing (U.S. Pat. No. 4,878,075, W098/4301). This kind of camera is capable of recording information as to the date and time of photographing, a photographing format, the length and breadth and the upper and lower and the right and left of a frame, ON/OFF of strobe and the like in the magnetic track. The information, which is recorded in magnetic layer, is used when a film image is picked up from the developed photographic film by an image sensor to be displayed on a TV monitor (W098/4301), or when simultaneous printing is performed. A film player disclosed in Japanese Pat. Application Laid-open No. 5-75922 uses the film cartridge.

The magnetic track which corresponds to each frame of the photographic film is limited in length. Therefore, only a small quantity of information concerning the frame is recorded in the magnetic track. As a result, there is a problem in that the satisfactory service cannot be provided in the laboratory and at home.

The magnetic information which is recorded and regenerated by an apparatus such as the film player using the photographic film, etc. differs according to a manufacture and a machine. Also, how to deal with information varies according to laboratories. In this case, some magnetic information recorded in the magnetic track cannot be dealt with by the machine and the laboratory, and there is a concern that undesired service is provided.

Furthermore, service in printing includes various processing such as printing by closing-up a part of a frame, producing reddish prints, and the like. Then users designate the number of prints made for each frame, paper surfaces, print size, etc. on an order sheet so as to obtain service in printing which meets their demands. Therefore, there is a problem in that the print order is complicated.

If kinds of print information and their contents are predetermined, it is possible to carry out the printing by use of a small-sized machine which has a function of a laboratory even in the development agency and at home, not in the laboratory.

SUMMARY OF THE INVENTION

It is an object of the present invention to provide a method of recording magnetic information, in which the provision of undesired service can be avoided and satisfactory service can be provided within the storage capacity for magnetic recording in the magnetic track of the photographic film.

It is another object of the present invention to provide a method of recording magnetic information, in which information concerning the order for an extra printing is recorded on a film having a magnetic layer, so that an extra printing can be automatically carried out.

To achieve the above-described objects, the method of recording magnetic information, in which magnetic information is recorded in a magnetic track on a roll of photographic film, comprises the steps of dividing the magnetic track into a leader track in a leader part at the forward end of the film and a frame track which is located at the rear of the leader track and corresponds to each frame track, recording a manufacturer identification code including a code which is peculiar to a certain manufacturer in the leader track, and recording magnetic information which is indicated by the manufacturer identification code in each frame track.

The present invention also comprises the steps of recording a function select code indicating a specific function among a plurality of functions recorded in the frame track instead of or together with the manufacturer identification code, and recording the magnetic information which corresponds to the function selected by the function select code in each frame track.

The present invention further comprises the steps of recording magnetic information, which is recorded in the leader track and each frame track, in an external record means when changing the function selected by the function selection code from the first function to the second one, and reading out information from the external record means to record magnetic information in the leader track and each frame track when returning from the second function to the first one.

Furthermore, according to the present invention the method of recording magnetic information, in which magnetic information is recorded in the magnetic track on a roll of developed photographic film, comprises the steps of reading an image on the film so as to display the image of one frame or plural frames on a TV monitor, entering at least one piece of information among information relating to a title of a roll of film, a method of printing for a title of a roll, order for special printing, print surface, print size, the number of prints ordered, designation of the frame ordered, the number of extra prints, a frame title, a method of printing a frame title, a method of printing the date and time of photographing, a close-up, the date and time of photographing, a print format, the up-down and right-left of an image and color correction while watching a TV monitor, and recording the entered magnetic information in the magnetic track in the film.

The present invention further comprises the steps of dividing the magnetic track into a leader track in a leader part at the forward end of the film and the frame track which is located at the rear of the leader track and corresponds to each frame, and recording in the leader track at least one piece of information among information relating to a roll title, a method of printing a roll title, order for special printing, print surface, print size, the number of prints ordered, designation of the frame ordered, and recording in the frame track at least one piece of information among information relating to the number of reprints, a frame title, a method of printing a frame title, a method of printing the date and time of photographing, a close-up, the date and time of photographing, a print format, the up-down and right-left, and color correction.

Furthermore, the present invention comprises the steps of recording the information indicating an instruction for printing a film image and the like on a post card (hereafter referred to as post-card printing) and the frame number of the frame to be printed, and recording magnetic information which indicates the value to be $\frac{1}{10}$ of the value of the actually instructed number of the post cards in the frame track corresponding to the frame number.

Moreover, the present invention comprises the steps of recording the information which indicates an instruction for a post-card printing, the frame number of the frame to be printed and a magnification N (where "N" is an integer) relating to the number of post cards to be printed, and recording the magnetic information which indicates the value to be 1/N of the actually instructed number of the post cards to be printed in the frame track corresponding to the frame number.

Furthermore, the present invention comprises the steps of the recording the magnetic information concerning the instruction for the post-card printing, the frame number of the frame for the post-card printing and the value in the upper figures of the actually instructed number of post cards to be printed, which is expressed in n-adic number system, and recording the magnetic information relating to the value in the lower figures of the actually instructed number of the post cards in the frame track corresponding to the frame number.

Furthermore, the present invention comprises the steps of recording instruction for post-card printing, the frame number of the frame to be printed and the information which indicates the value in the upper places of the actual number of the post cards to be printed, which is expressed in N-adic number system, in the leader track, and recording the information which indicates the value in the lower places of the actual number of the post cards to be printed in the frame track corresponding to the frame number.

According to the present invention, the magnetic track is divided into the leader track on the forward end part of the film and the frame track corresponding to each frame which is located on the part following said forward end part. The manufacturer identification code including the manufacturer code, which is peculiar to the manufacturer, is recorded in the leader track. In each frame track, magnetic information is recorded, which is determined by the manufacturer identification code. Therefore, a machine or a laboratory can recognize the manufacturer and requested/provided service by reading the manufacturer identification code recorded in the leader track. As a result, they can determine whether or not they can cope with the magnetic information recorded in each frame track. If they cannot, a warning is made in the machines, or the service is provided in another laboratory which can cope with the magnetic information, or the film is returned to the user with the notice saying they can not provide the service.

In one mode of the present invention, the function selection code indicating a specific function is recorded in the leader track. On the other hand, only the magnetic information corresponding to the function which is selected by the function selection code in each frame track is recorded in each frame track. As a result, each frame track can be used for each function. Accordingly, satisfactory service can be provided within the storage capacity of the magnetic track.

In another mode of the present invention, when the function which is selected by the function selection code is changed, magnetic information relating to the function before the changing is deleted so that new magnetic information can be recorded. However, magnetic information relating to the function before the changing is still recorded in an outer record medium. Therefore, recording magnetic information in the outer record medium is recorded in the leader track and each frame track, so that the magnetic information before the changing can be obtained again.

In the other mode of the present invention, the user enters magnetic information concerning the printing while looking at the image to be printed on the TV monitor and records magnetic information in the magnetic track. As a result, the magnetic information concerning the printing can be recorded easily and without mistakes. Moreover, the magnetic track is divided into the leader track and the frame track. The magnetic information relating to a roll of film as a whole is recorded in the leader track and information relating to each frame is recorded in each frame track. Further, the number of prints in the post-card printing is larger than that in ordinary extra printing. Therefore, the value indicating the number of prints, which is recorded in each frame track, is processed so that the value can indicate the larger number. As a result, the magnetic track of each frame track, in which information concerning extra printing is recorded, can be used for both ordinary extra printing and the post-card printing. Then, the extra printing is performed in accordance with these pieces of information so that all of the processing for the extra printing can be automatically carried out.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures and wherein:

FIGS. 6(A), 6(B), 6(C), and 6(D) are views illustrating a storage region in a CCD buffer and a display buffer and a display screen of a monitor TV in film player of FIG. 1;

FIG. 11 is a flow chart illustrating a operational procedure of automatic printing; and, FIG. 12 is an external view of an automatic printing apparatus.

DESCRIPTION OF THE PREFERRED EMBODIMENT

A detailed description will hereunder be given of the preferred embodiment of a method of recording magnetic information according to the present invention with reference to the accompanying drawings.

Figure 1:
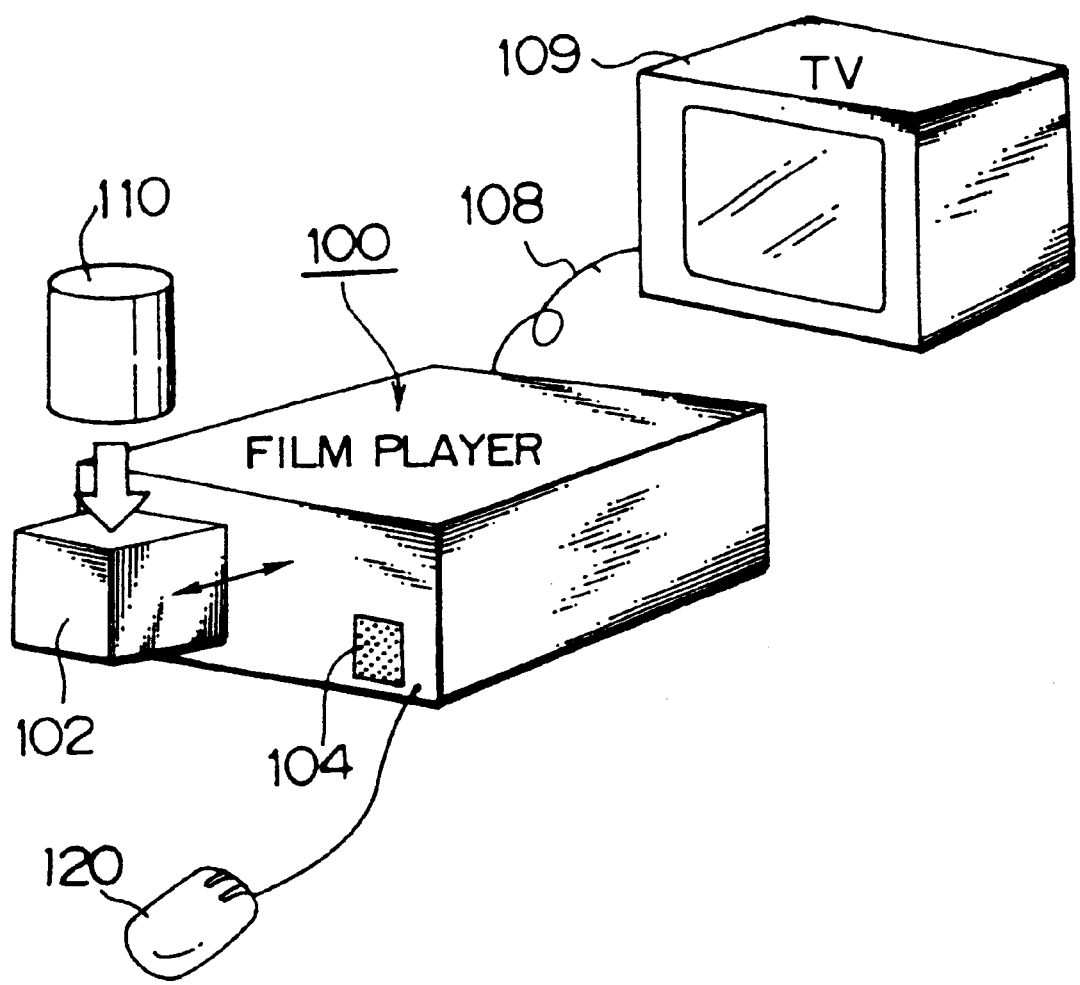
FIG. 1 is an external view of a film player to which a method of recording magnetic information according to the present invention is applied.

FIG. 1 is an external view of a film player to which the method of recording magnetic information according to the present invention is applied. As shown in FIG. 1, the film player 100 has a rectangular-parallelepiped shape, and a film cartridge tray 102 and a power source switch 104 are provided on the front surface of it. The film cartridge tray 102 is driven to move forward and backward when the film cartridge 110 is loaded/unloaded, so that a film cartridge is housed or taken out.

A mouse 120 and a TV monitor 109 are connected to the film player 100, and various kinds of operational signals are transmitted from the mouse 120 to a film player 100 via a signal cable 106 so as to control the film player 100. A video signal is transmitted from the film player 100 to the TV monitor 109 via a signal cable 108. A detailed explanation will be given later of the mouse 120 controlling the film player 100.

Figure 2:
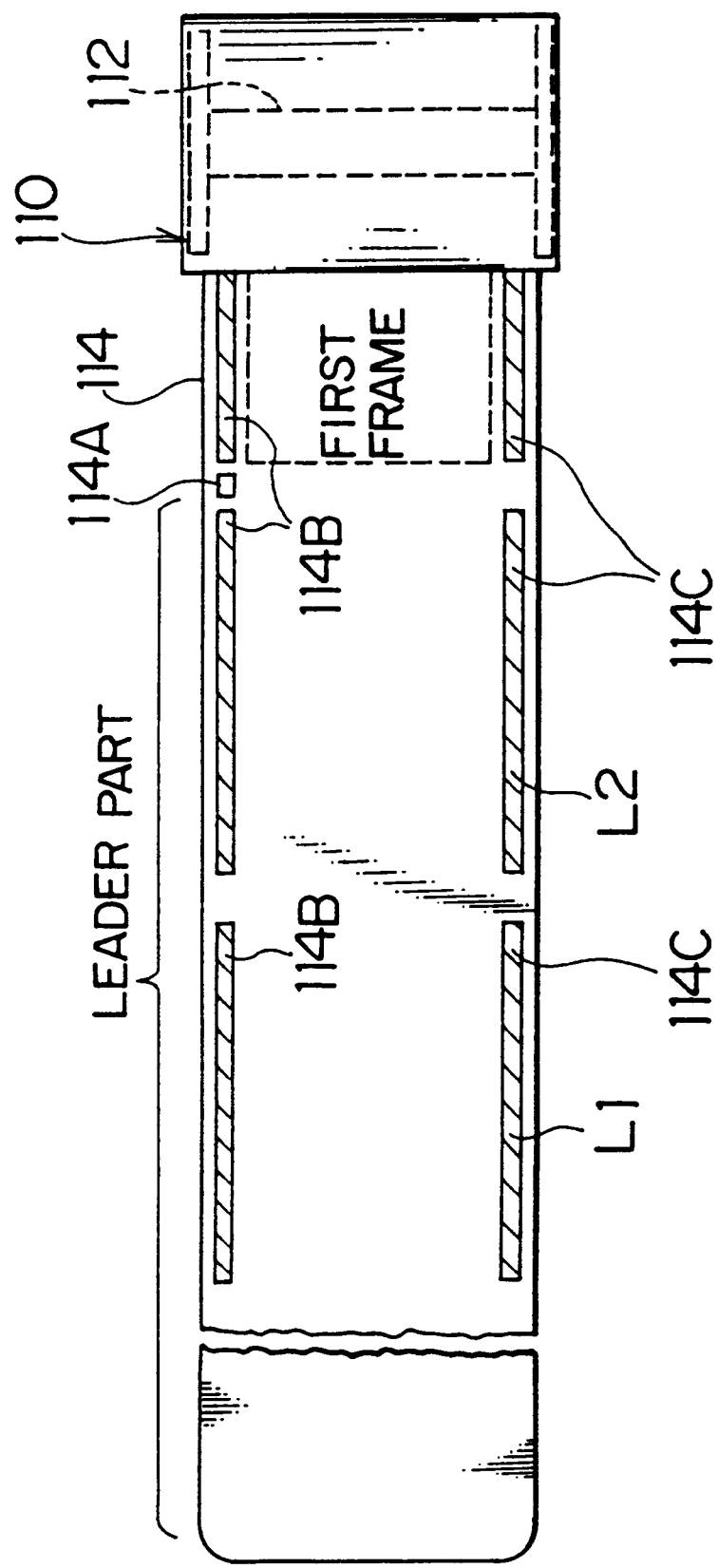
FIG. 2 is a view illustrating one example of a film cartridge which is applied to a film player of FIG. 1.

The film cartridge 110 has a single spool 112 as shown in FIG. 2, and a photo film 114 is wound around the spool 112. A perforation 114A is formed on the photo film 114 so as to indicate a position of each frame. And, a transparent magnetic layer is provided in the photo film 114, and magnetic tracks 114B and 114C are formed on the edge of the film. The magnetic track 114B is a track which is used in a laboratory and a development agency, and the magnetic track 114C is a track which is used by the user.

Here, in a roll of the film, a part between the forward end of the film and the perforation 114A which indicates the position of the first frame is called a leader part, and the part of the film following the perforation 114A indicating the first frame is called a frame part. The magnetic tracks 114C locating in the leader part are called leader tracks L1 and L2, and the magnetic track locating in the frame part is called a frame track. Information concerning the film as a whole is recorded in the leader track and, information relating to each frame is recorded in each frame track.

The magnetic information is recorded in these tracks by a camera which is provided with a magnetic head, a film player 100 and the like. The magnetic information which is recorded by the camera relates to, for example, photographing conditions, pseudo-zooming, frame numbers, print format which indicates whether the image is high-definition, panoramic, or normal image, the date/time of photographing, and so forth, and many kinds of information can be recorded by the camera.

Furthermore, the data relating to a type of a film, a bar code indicating frame numbers and a frame format which is made by the light source provided in the camera, etc. can be optically recorded on the photographic film 114 except for the frame area which is exposed by the light of the subject. The developed photo film 114 is wound into the film cartridge 110, so that it can be stored.

Figure 3:
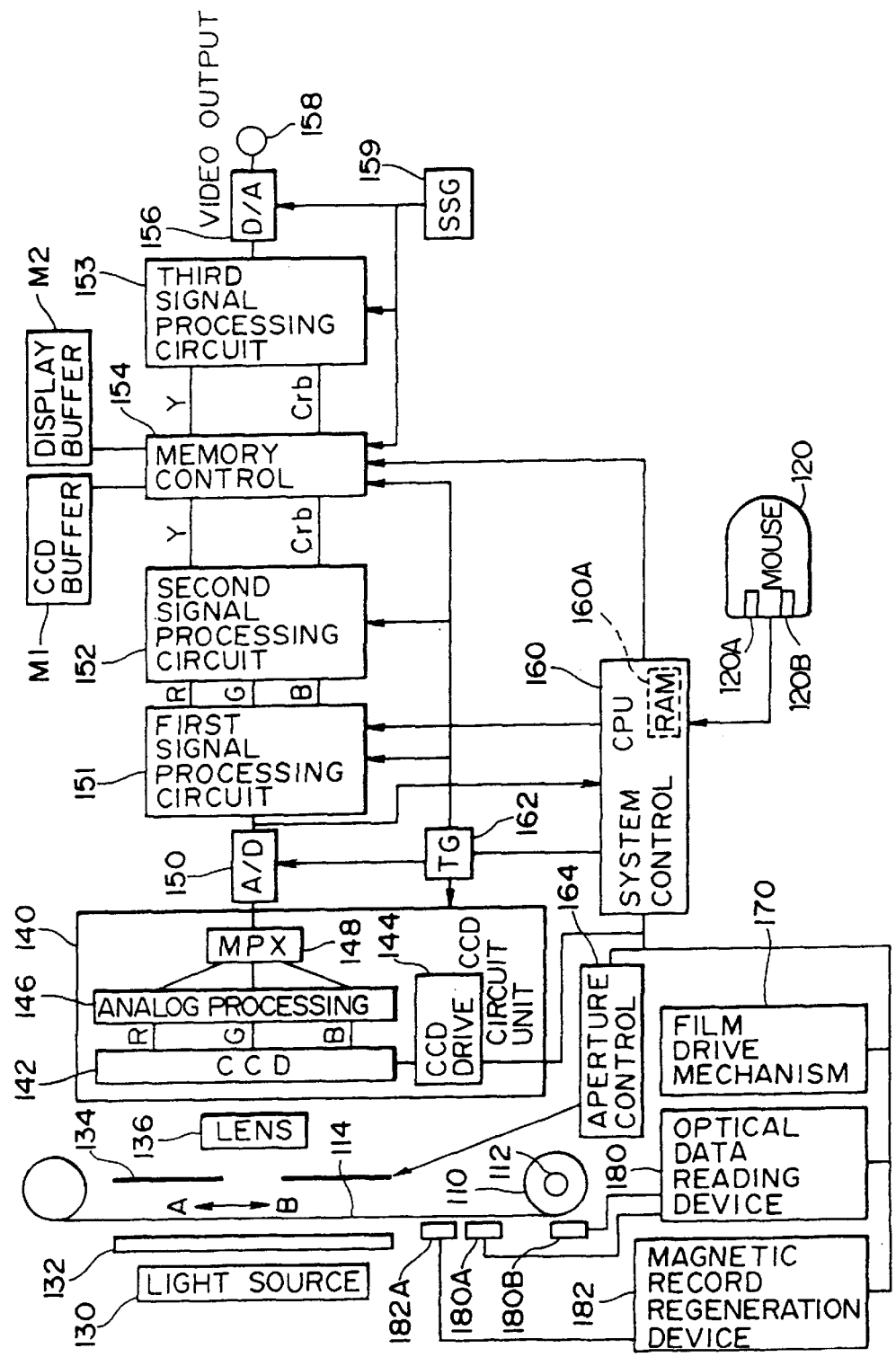
FIG. 3 is a block diagram illustrating one embodiment of an inner structure of a film player which is shown in FIG. 1.

FIG. 3 is a block diagram illustrating one embodiment of the film player 100. The film player 100 mainly comprises a light source 130 for illuminations a taking lens 136, a CCD circuit unit 140 which includes a CCD line sensor 142, a first signal processing circuit 151, a second signal processing circuit 152, a third signal processing circuit 153, a memory control circuit 154, a CCD buffer M1, a display buffer M2, a central processing unit (CPU) 160, a film drive mechanism 170, an optical data reading device 180, a device for magnetic recording and regeneration 182 and the like.

The light source 130 is a long fluorescent light which is provided in the direction perpendicular to the feed direction of the film 114, and illuminates the film 114 through an infrared cutting filter 132. The light, which has ben transmitted through the film 114, is formed on the light-accepting surface of the CCD line sensor 142 through the taking lens 136 which is a fixed-focus type. While the CCD line sensor 142 is picking up the film image, the film 114 is moved in the direction of an arrow A (hereafter referred to as a forward direction) or in the direction of an arrow B (hereafter referred to as a backward direction) at a fixed speed by the film drive mechanism 170. A detailed description will be given of the film drive later.

The CCD line sensor 142 is provided in the direction perpendicular to the film feed direction. And, the image light formed on the light-accepting surface of the CCD line sensor 142 is charged for a predetermined period of time in each sensor which has R, G and B filters, and then is converted into R, G and B signal charge in accordance with the light strength. The signal charge is sent to a shift register by a lead gate pulse of a predetermined cycle, which is added by a CCD drive circuit 144, and is sequentially read out by a register transfer pulse.

The CCD line sensor 142 has, for example, a sensor of 1024 picture elements in the direction perpendicular to the film feed direction. The number of picture elements in the same direction as the film feed direction of one frame changes according to the film feed speed when a cycle of the lead gate pulse, etc. in the CCD drive circuit 144 does not change. In this embodiment, when the film feed sped is ½, 1, 8, 16 times as fast as that in the case when the standard film image is picked up, the number of picture elements is 1792, 896, 112, and 56 respectively.

The signal charge which has been read out from the CCD line sensor 142 is clamped by a CDS clamp and transmitted to an analog processing circuit 146, and gain and the like of R, G and B signals are controlled in the circuit 146. The multiplexer 148 dot-sequentially transmits R, G and B signals which are sent from the analog processing circuit 146, and the R, G and B signals are converted into digital signals by the A/D converter 150, and then added to the first signal processing circuit 151 and the CPU 160.

The first signal processing circuit 151 includes a white-balance adjustment circuit, a negative-positive inversion circuit, a γ-correction circuit, a RGB circuit which transmits R, G and B signals simultaneously, and so forth, and sends R, G and B signals to the second signal processing circuit 152 after signal-processing the dot-sequential R, G and B signals, which are sequentially added, in each circuit. The white-balance adjustment circuit in the first signal processing circuit 151 carries out the white-balance adjustment in accordance with a control signal which is added by the CPU 160, and a detailed explanation on it will be given later.

The second signal processing circuit 152 has a matrix circuit, and generates a luminance signal Y and a chroma signal $C_{r/b}$ in accordance with the entered R, G and B signals, and sends these signals to a memory control circuit 154.

The memory control circuit 154 controls the transmission of the luminance signal Y and the chroma signal $C_{r/b}$ from the memory control circuit to the CCD buffer M1, and also controls the transmission of the luminance signal Y and the chroma signal $C_{r/b}$ from the CCD buffer M1 to the display buffer M2. A detailed explanation will be given of the controlling of the reading/writing in the CCD buffer M1 and the display buffer M2.

The luminance signal Y and the chroma signal $C_{r/b}$, which are read out from the display buffer M2 by the memory control circuit 154, are sent to the third signal processing circuit 153. The third signal processing circuit 153 generates a color composite video signal of NTSC system, for example, in accordance with the entered luminance signal Y and the chroma signal $C_{r/b}$, and transmits it to a video output terminal 158 via a D/A converter 156. A synchronizing signal which has a predetermined cycle is transmitted to the memory control circuit 154, the third signal processing circuit 156 and the D/A converter 156 from a sync-generator 159. And, a timing signal which is controlled by the CPU 160 is added to the CCD circuit unit 140, the A/D converter 150, the first signal processing circuit 151, the second signal processing circuit 152, and the memory control circuit 154 from a timing signal generator 162 which is controlled by the CPU 160, so that each circuit can be synchronized.

The film drive mechanism 170 is connected to the spool 112 of the film cartridge 110, and comprises a film supplying part which rotates the spool 112 forward/backward, a film winding part which winds the film 114 sent out from the film supplying part, and a part which is provided in a film conveying path and which feeds the film 114 at a fixed speed through and between a capstan and a pinch roller. The film supplying part drives the spool 112 of the film cartridge 110 clockwise in FIG. 3, and feeds the film 114 from the film cartridge 110 until the forward end of the film is wound up by the film winding part.

The optical data reading device 180 includes a first optical sensor 180A, which optically detects the perforation 114A on the film 114, and a second optical sensor 180B which optically detects the optical data such as a bar code, etc., which are written at the edge of the film, and processes the optical data which is detected by the optical sensors 180A and 180B and transmits them to the CPU 160.

The magnetic data regenerating device 182 has the magnetic head 182A, and reads the magnetic data, which is recorded in the magnetic track 114C of the film 114, with magnetic head 182A. The device 182 processes the magnetic data, send it to the CPU 160, and stores it in a RAM 160A. Then, the device 182 reads out the data stored in the RAM 160A of the CPU 160, converts it into appropriate signals for a magnetic recording to transmit it to the magnetic head 182A so as to record it in the magnetic record layer 114B of the film 114.

Figure 4:
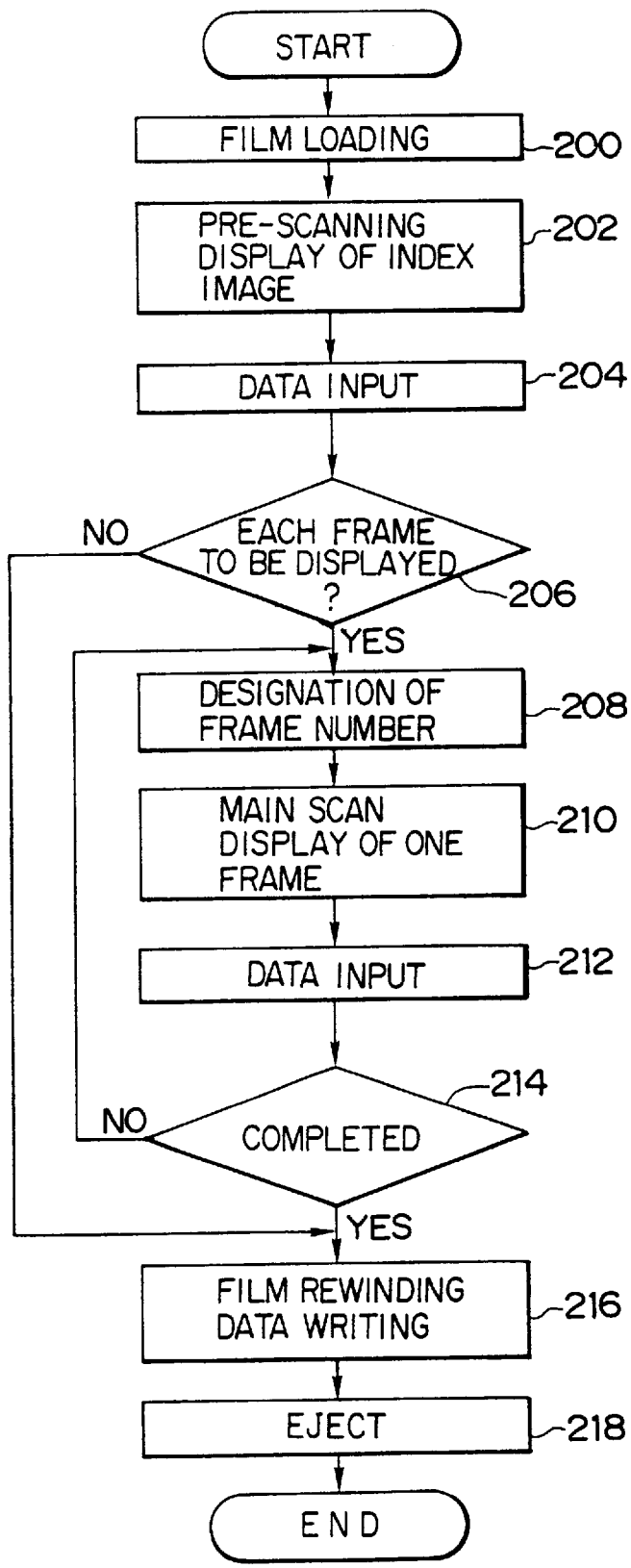
FIG. 4 is a flow chart for explaining the operation of film player of FIG. 1.

Next, an explanation will be given of the operation of the film player 100 which is constructed in the above-mentioned manner with reference to a flow chart in FIG. 4.

The film player 100 has a function of automatically regenerating the film image on the TV monitor 109, and also has a function of ordering to the laboratory, a function of automatically printing the film image by connecting to a video printer which is not shown in the drawing, and so forth. These functions are appropriately selected.

First, when the film cartridge 110 is set in the film cartridge tray 102, the CPU 160 carries out the film-loading by controlling the film drive mechanism 170 (Step 200). That is, the film 114 is sent out from the film cartridge 110, and the forward end of the film is wound around a winding axis of the film winding part.

Figure 5:
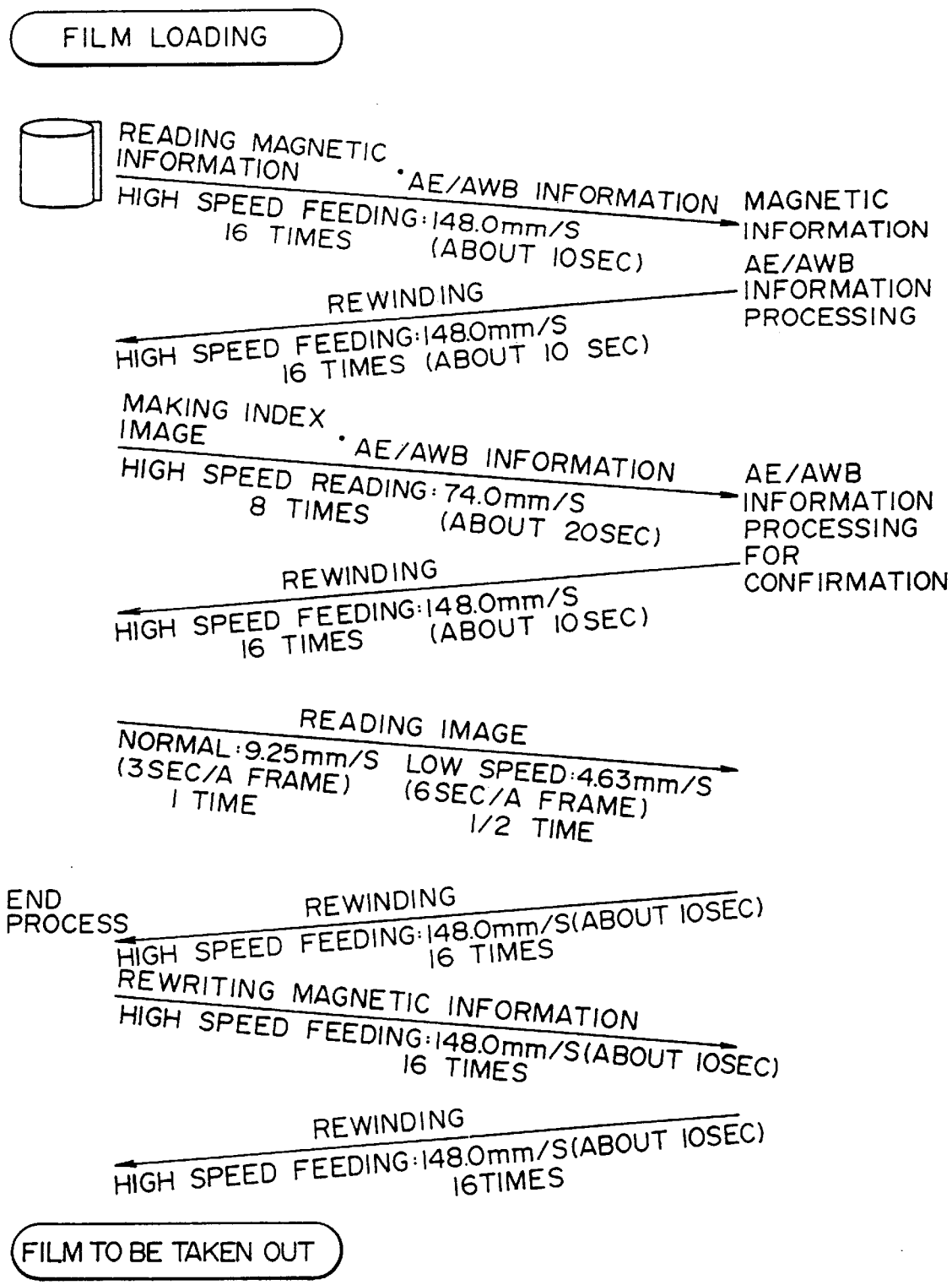
FIG. 5 is a view illustrating one example of a conveyance sequence of a film which is conveyed in film player of FIG. 1.

When the film-loading is completed, the first pre-scanning of the film 114 is carried out. That is, as shown in FIG. 5, the film 114 is fed in the forward direction at a high speed of 148.0 mm/s, and then rewound in the backward direction at a high speed of 148.0 mm/s. When the above-mentioned first pre-scanning is performed, the image data is picked up by the CCD line sensor 142, and the optical data and the magnetic data are read out by the optical data reading device 180 and the magnetic record and regeneration device 182.

Next, an explanation will be given of the processing in accordance with the image data which is picked up when the above-mentioned first pre-scanning is carried out.

The dot-sequential R, G and B signals are sent from the A/D converter 150 which is shown in FIG. 3 to the CPU 160. The CPU 160 receives the signals R, G and B of all frames respectively, and calculates offset quantity and gain adjustment quantity to adjust the white-balance for respective R, G and B signals. Then, it stores offset data, which indicates the offset quantity and AWB data, which indicates the gain adjustment quantity for each frame, in a random access memory (RAM) 160A provided in the CPU. And, the CPU 160 stores AE data indicating the brightness of each frame, which R, G and B signals have in the RAM 160A. The CPU 160 detects each frame on the film 114 in accordance with the optical data and/or magnetic data which is added by an optical data reading device 180 and the magnetic record regeneration device 182. And, it also detects frame numbers by counting each frame.

Next, the second pre-scanning of the film 114 is performed. That is, as shown in FIG. 5, the film 114 is fed again in the forward direction at a high speed of 74.0 mm/s, and then it is rewound in the backward direction at a high speed of 148.0 mm/s. When the second pre-scanning is performed in the forward direction, the image data is picked up by the CCD line sensor 142. When the image data is picked up, the CPU 160 controls an aperture 134 in each frame with an aperture control device 164 in accordance with the AE data which is stored in the RAM 160A.

The CPU 160 makes the first signal processing circuit 151 adjust the offset quantity and the white balance of the signals R, G and B for each frame. That is, the CPU 160 sends the offset data of the respective R, G and B signals in each frame to the first signal processing circuit 151 offset quantity of the dot sequential signals R, G and B in accordance with the offset data. Similarly, the CPU 160 sends the AWB data of respective R, G and B signals in each frame, which is stored in the RAM 160A, to the first signal processing circuit 151. The circuit 151 adjusts the gain of the dot-sequential signals R, G and B in accordance with the AWB data.

The image data in each frame is adjusted according to the AE data, the AWB data, etc., so that the high-quality image data can be picked up regardless of photographing conditions in each frame.

The adjusted image data in each frame, that is, the luminance signal Y and the chroma signal $C_{r/b}$ which are transmitted from the second signal processing circuit 152 are sequentially stored in the CCD buffer M1 by the memory control circuit 154. As described above, the film 114 is fed at a speed which is eight times as fast as the feed speed in the case when the normal film image is picked up, the number of picture elements in the same direction as the film feed direction of one frame is 112 as shown in FIG. 6(A). The CCD line sensor 142 has a sensor of 1024 picture elements in the direction perpendicular to the film feed direction as mentioned previously. In this case, the picture elements are thinned out to be 1/16 of 1024 picture elements, therefore, the number of picture elements in the direction perpendicular to the film feed direction of one frame is 64. And, the CCD buffer M1 has a storage capacity for storing the data of 512×1024 picture elements as shown in FIG. 6(A), so it can store the image data of 5×4×2(=40) frames. That is, the image data (the index image data) showing the index image of 40 frames are stored in the CCD buffer memory.

The display buffer M2 has a capacity for storing the data of 512×1024 picture elements as shown in FIG. 6(B). When storing the index image data, it stores the image data of 5×4×2(=40) frames in a state that the picture elements of each frame is thinned out to be 73×128. And, when the index image is displayed on the TV monitor 108, the region of 480×640 picture elements at the upper left of the display buffer M2 is read out (refer to FIGS. 6(B) and 6(C)).

Because the display buffer M2 can store the image data for only twenty frames at a time, it displays the index image of 40 frames by scrolling the index image or switching screens. The CPU 160 displays the index image, in which frame numbers are superimposed, by designating each frame to be No. 1, No. 2 . . . according to the order that the image data in each frame are read out at the time of the scanning and sending a character signal which indicates a frame number of each frame (Step 202).

When the index image is produced as described above and the index image is displayed on the TV monitor 109, the user enters various types of information (hereafter referred to as automatic regeneration information) which is required for displaying a desired film image on the TV monitor 109 and information (hereafter referred to as at-home printing information) which is required for printing the frame image at home, or information concerning an order for the laboratory (Step 204).

A function selection feature, which is not shown in the drawing, selects a automatic regeneration function, an at-home printing function, a function of the order for a laboratory. Automatic regeneration information which is entered when the automatic regeneration function is selected is as follows:

Information Relating to Raising an Effect of Automatic Regeneration

Information relating the length and breadth of a frame: information relating to having a regenerated image correctly positioned on a monitor and information relating to instructing the up-down and right-left of the image.

Character information: information concerning the character for each frame and a film as a whole.

Time/date information: information relating to the date and time of photographing for each frame.

Regenerated image information: information relating to designating a range which is to be regenerated on the monitor.

Color Correction Information: information which is set manually for designating luminance, color, color density, contrast and sharpness of each frame.

Special monitor effect information: information relating to an automatic color correction according to the contents of each frame screen (sunset effect, night view effect and the like).

Close-up information: information relating to magnification/a central position for enlargement.

Automatic zooming information: information relating to magnification at the start of zooming, magnification at the end of zooming, and zooming time.

Screen switch information: information for designating a method of switching screens frame to frame, which indicates immediate switching, scroll in/out, fade in/out, overlapping, wipe in/out, and time of these switching (a second is a unit).

Screen movement information: information concerning the scanning within a screen of a frame (information relating to panning and tilting) and information relating to time for above-mentioned movement.

Display time information: information relating to the displaying time of each frame (a second is a unit).

Sound information at the time of regeneration: instruction as to what kind of music is played at the time of automatic regeneration (instruction for each frame or a film strip as a whole).

Character display information: information relating to display/non-display of a title, the date and time and the like, and a display color and a display position.

Other Information

Automatic color correction information: information which is automatically set at the time of pre-scanning, relating to the previously-mentioned AE and ALB data.

Information Relating to the Control of Automatic Regeneration

Start frame information: information concerning a start frame number at the time of automatic display.

End frame information: information concerning a frame number of an end frame at the time of automatic display.

Next frame information: information relating to a frame number of a frame to be displayed after the displayed frame.

Non-regenerated frame information: information relating to instructing a frame number which is not regenerated at the time of automatic display, or information which is provided for each frame, relating to whether a frame is regenerated or not.

Each piece of the above-described information is entered by an [EXECUTE] key 120A and a [CANCEL] key 120B (refer to FIG. 3) of a mouse 120, and by instructing a position of an arrow with a roll.

Figure 7:
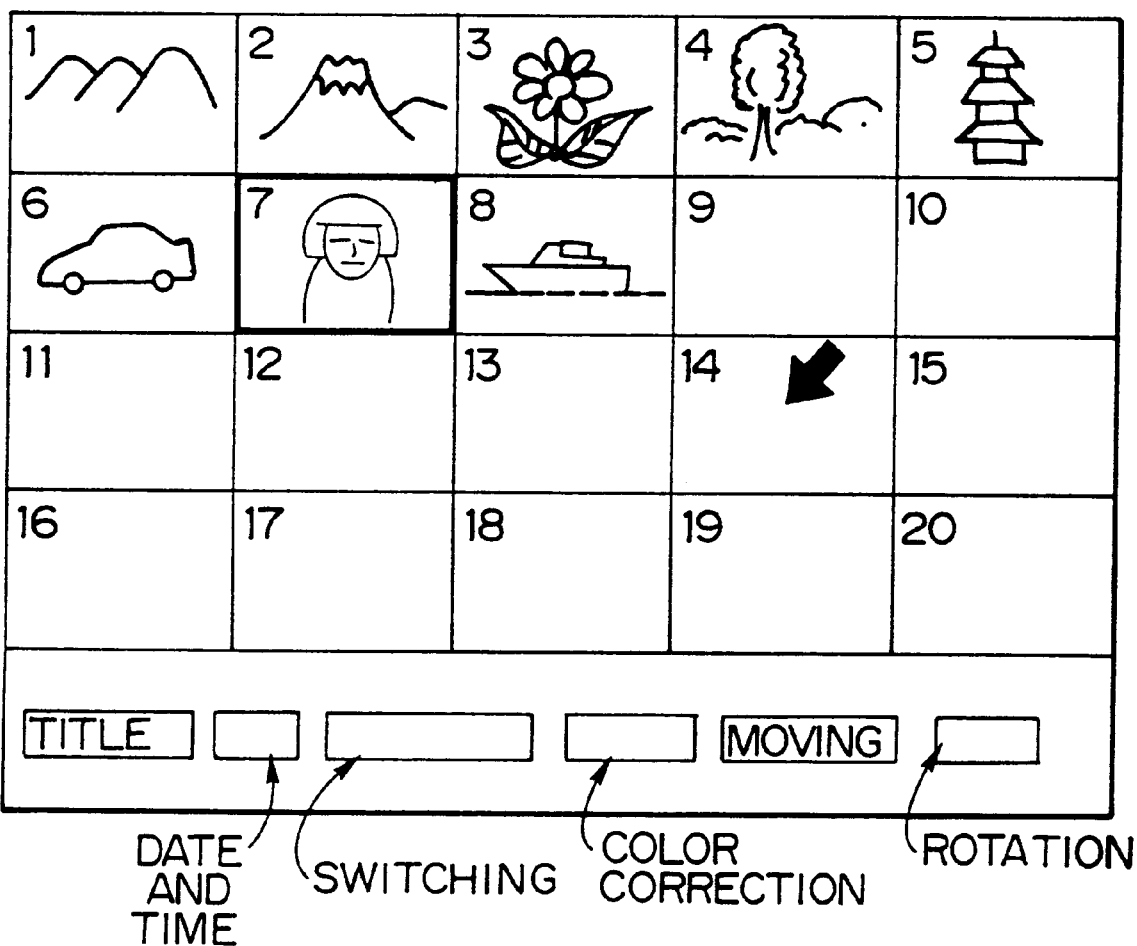
FIG. 7 is a view illustrating one example of a monitor screen when information relating to automatic regeneration is entered using an index image.

That is, as shown in FIG. 7, when the automatic regeneration function is selected, the CPU 160 displays the index image showing 20 frames, characters which indicate various ways of setting a menu or an icon at the lower side on a monitor screen. A frame to be edited on the index screen is selected by moving the arrow to the frame to be edited with the mouse 120 and then clicking the [EXECUTE] key 120A. On the selected frame, a black frame which is darker than other frames is displayed as shown in the seventh frame in FIG. 7.

After that, the arrow is moved to characters or an icon which indicates an optional setting menu, and the [EXECUTE] key 120A is operated, so that the setting menu can be selected.

For example, when the information concerning the regeneration order of each frames is entered, the menu to set the regeneration order is selected with the mouse 120. Then, the arrow is moved to a frame corresponding to the regeneration order with the mouse 120, and the [EXECUTE] key 120A is clicked. By repeating this operation, the regeneration order for a plurality of frames can be entered. By displaying a number, which indicates the regeneration order, in each frame of the index image every time the regeneration order is instructed, an overlap instruction can be avoided. And, the information relating to the frame numbers of frames which are instructed to be regenerated first and last corresponds to the previously-mentioned numbers of the regeneration start frame information and the regeneration end frame information respectively, and information relating to frame numbers of frames which are not designated corresponds to non-regeneration frame information. Similarly, each piece of the above-described information can be entered with the mouse 120 by interactive processing on screen. After the entry of the information is over, it is selected whether or not one frame is displayed on the monitor (Step 206). When it is determined that one frame is displayed on the monitor, it is possible to enter the same information while looking at the frame image.

That is, a frame number is set (Step 208), and then the film 114 is fed in the forward direction at a speed of 9.25 mm/s by one frame, so that the frame of the set frame number is scanned (main-scanning) (Step 210). When the main-scanning is performed, the image data is picked up by the CCD buffer M1 via the CCD line sensor 142.

When the image data is picked up, the CPU 160 adjusts the image data of each frame according to AE data, AWB data and the like which are stored in the RAM 160A, so the high-quality image data can be picked up regardless of the photographing conditions of each frame. The number of picture elements in each frame, which is transmitted to the CCD buffer M1, is 512×896 as shown in FIG. 6(D). That is, the CCD output of the CCD line sensor 142 having a sensor of 1024 picture elements is thinned out to be half, so that the number of picture elements in the direction perpendicular to that in which the film is fed by one frame. The film feed speed is set to be ⅛ compared to that in the case when the image data of the index image are picked up, so that the number of picture elements of one frame is 896, which is eight times as large as that of picture elements (112) in the same direction as the film feed direction of one frame of the index image.

Figure 8A:
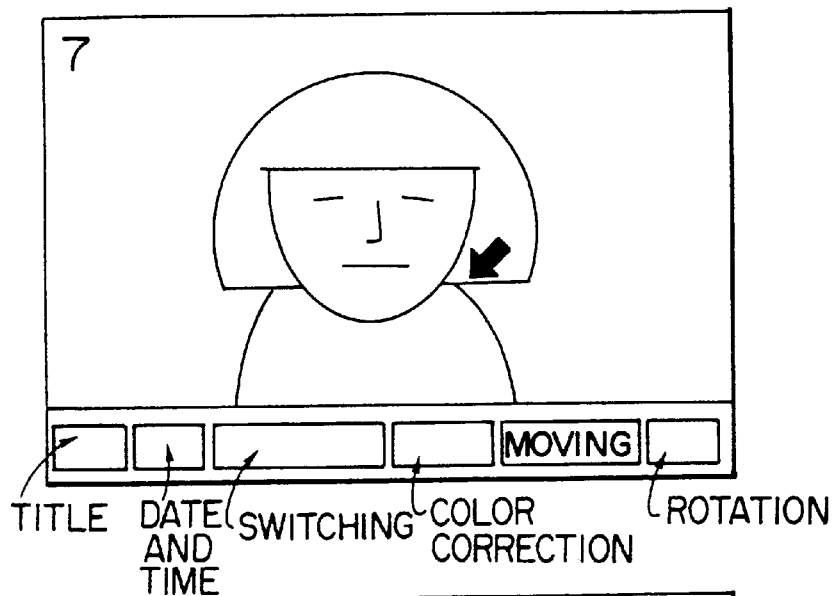
FIGS. 8(A), 8(B) and 8(C) are views illustrating one example of a monitor screen when information relating to automatic regeneration is entered using one frame image.
Figure 8B:
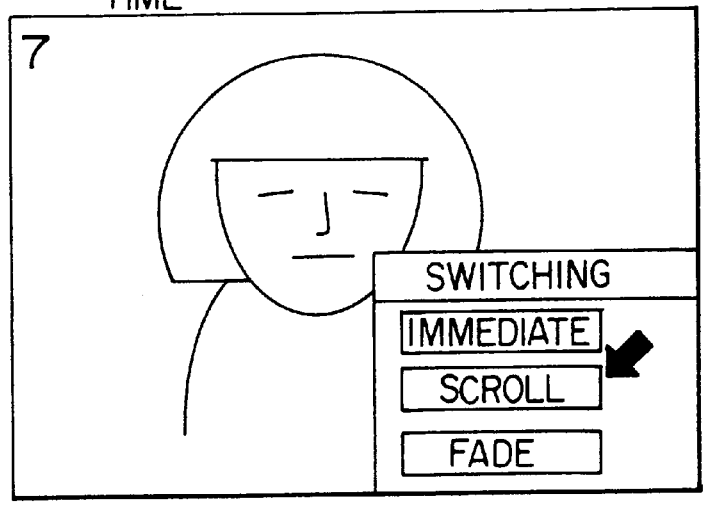

The image data in one frame, which is transmitted to the CCD buffer M1 in the above-mentioned way, is transferred to the display buffer M2, and the data in the display buffer M2 is read out so that the image data in one frame can be displayed on the monitor TV 106. A frame number ("7" is indicated in the drawing) is displayed at the upper left of the monitor screen as shown in FIG. 8(A), and a character or an icon which indicates various types of the setting menu is displayed at the lower part of the monitor screen.

The above-mentioned menu is selected with the mouse 120, just like when the information is entered by use of the index image.

Here, when the mouse 120 is moved so that the arrow moves to the desired parameter and the [EXECUTE] key 120A is clicked again, the selected parameter starts blinking. And, when the [EXECUTE] key 120A is clicked again, the parameter is set and the setting screen of the item disappears.

Next, an explanation will be given of the case when information relating to characters are entered by use of a key board which is not shown in the drawing.

Figure 8C:
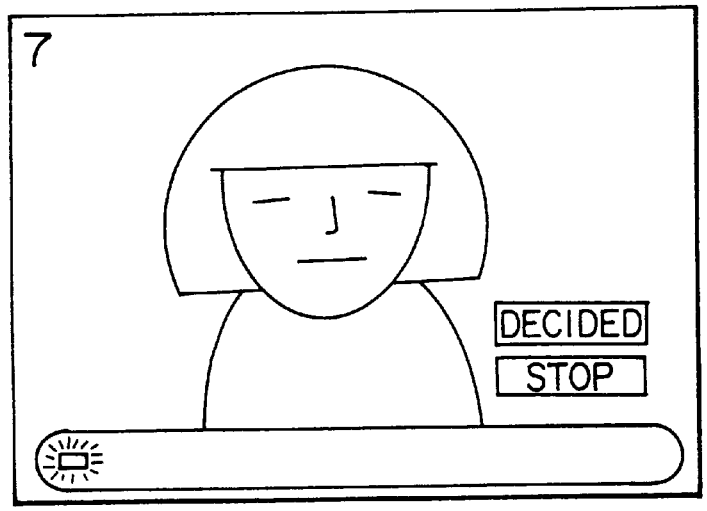

In this case, the arrow is first moved with the mouse 120, so that characters "title " or an icon on the setting screen is selected, and the [EXECUTE] key 120A is clicked. As a result, the title setting menu appears on the screen, and a rectangular white column (left corner of which blinks) is displayed at the lower part of the monitor screen, and the characters [DECIDED] and [STOP] are displayed at the right of the white column as shown in FIG. 8(C).

Next, when the key board (not shown in the drawing) which is connected to the film player 100 is operated, titles are entered from the left corner toward the right side. The blinking position moves toward the right side. In the case that a correction is necessary during the entry of characters, the [CANCEL] key 120B is clicked. As a result, characters of the title in the blinking part at the right side disappears one by one. When the entry is over, the arrow is moved to [DECIDED] by use of the mouse 120, and the key 120A is clicked. As a result, the title setting is completed, and the white column and the characters [DECIDED] and [STOP] disappear. In the case when the title entry is stopped, the arrow is moved to [STOP] disappear. In the case when the title entry is stopped, the arrow is moved to [STOP] by use of the mouse 120, and the [EXECUTE] key 120A is clicked. As a result, the title information disappears, and the title before setting remains.

In the above-mentioned way, various types of information can be entered by use of the mouse 120 by the interactive processing on screen. When the entry of the above-mentioned information is over (Step 214), or when the frame display is not selected in the step 206, the film 114 is fed in the forward direction at a high speed of 148.0 mm/s. During the feeding, magnetic data stored in RAM 160A of CPU 160 is recorded in the magnetic track 114C on the film 114 (STEP 216). After the completion of recording magnetic data, the film 114 is rewound in the backward direction at a high speed of 148.0 mm/s, and then the film cartridge 110 is taken out (STEP 218).

Next, an explanation will be given of the method of recording magnetic data in the magnetic track 114C.

Figure 9A:
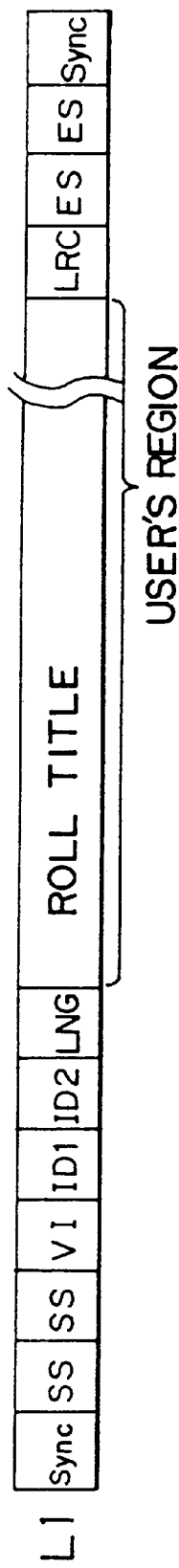
FIGS. 9(A) and 9(B) are views illustrating a record format of a magnetic track in a method of recording magnetic information according to present invention.
Figure 9B:
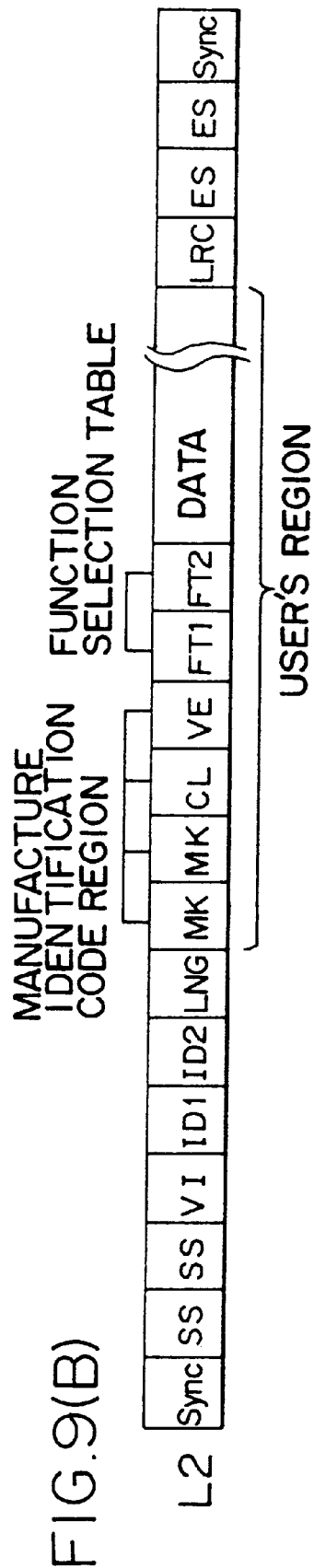

FIG. 9 shows a record format for leader tracks L1 and L2 in the leader part in the magnetic track 114C of FIG. 2 for users. As shown in FIG. 9, Sync is a synchronizing signal, SS is a start signal, VI is data indicating a version of the recording method, ID1 and ID2 are data which determines types of a data field and types of information included in the data field, LNG is data which determines the data length of the whole data field, LRC is data which is used for error-checking and correction in the whole data field, and ES is a region in which data indicating an end signal is stored. A user's region is provided between the region LNG and the region LRC.

In the user's region in the leader track L1, a title of a roll of film, for example, is recorded. In the user region in the leader track L2, a manufacturer identification code region of 4 bytes and function selection tables of 2 bytes FT1 and FT2 are provided at its head, and regions for recording other data are provided behind them.

In the manufacturer identification code region, a manufacturer code MK of 2 bytes, which is peculiar to a manufacturer, is recorded, and a classification code CL and a version management code VE of one bytes are respectively recorded next. The classification code CL is the data indicating the classification pedicular to a manufacturer (for example, a number of an apparatus), and the version management code VE is the data which indicates what is included in the service. That is, when a virgin film (a film which is not magnetically recorded in the leader track and the like) is set, or when there is an order from the user, the film player 100 automatically records the manufacturer code MK, the classification code CL and the version management code VE which are previously set in the manufacturer identification code region.

The magnetic identification code is read by a film player, other machines and the like. As a result, a machine, a laboratory and users can recognize the manufacturer and requested/provided service. That is, they can determine whether they can cope with the magnetic information or not, from the readout manufacturer identification code. If they cannot, a warning is made in the machine, the service is provided in another laboratory which can cope with the magnetic information, or the film is return to the user with the notice saying they can not provide the service, so that the provision of an incorrect service can be prevented.

The function selection code, which indicates desired service (one service among automatic regeneration, printing at home, order for the laboratory and the like) selected by the user, is recorded in the function selection tables FT1 and FT2 of two bytes next to the manufacture identification code region. The data, which corresponds to the service recorded in the function selection tables FT1 and FT2, is only recorded in each frame track. As a result, satisfactory service can be provided although the storage capacity for magnetic recording in the frame track is limited.

Moreover, the function selection is divided into a rough classification and a detailed classification which subdivides the rough classification. The function selection code, which represent the rough classification and the detailed classification respectively, are recorded in the function selection tables FT1 and FT2. For example, when a TV slide show is selected in the rough classification, one of full-automatic regeneration (automatic regeneration according to the instruction of the apparatus when the film is inserted) and automatic regeneration (regeneration according to the instruction of the user) is selected in the detailed classification, and what is recorded in the frame track is changed. As a result, the satisfactory service can be provided.

The above-described items are the ones to be set at the time of the automatic regeneration. That is, when the full automatic regeneration or the automatic regeneration is selected in the detailed classification, information to be recorded in each frame track is divided as follows.

Full-Automatic Regeneration

Leader track: compatible data between machines in the automatic color correction information, information relating to a number of a start frame.

Frame: track information relating to automatic color correction, the length and breadth of a frame, a frame number of an end frame, a frame number of the frame to be processed next, instruction of the frame not be regenerated, sound at a regeneration, characters, the data and time of photographing, and the instruction of character display.

Automatic Regeneration

Leader track: color correction and a number of a start frame.

Frame track: information relating to color correction, a special monitor effect, a close-up, the length and breadth of a frame, screen-switching, movement on the screen, time of screen display, a frame number of an end frame, a frame number of a next frame, designation of a non-regenerated frame, sound at the time of regeneration, characters, the date and time of photographing and designation of character display.

In the above-described embodiment, the explanation was given of the case that the function of automatic regeneration is selected. On the other hand, the information relating to an order for a laboratory, which is entered when the function of the order for the laboratory is selected, is as follows:

What is Recorded in the Leader Track

Roll title information: information concerning the title of the whole film.

Roll title printing information: information as to whether or there are characters to be printed, a color of a character to be printed, a position of a character (surface, back, etc.), the designation with regard to the form of a character (outline type, half, background processing omitted, etc.)

Special print order information: information concerning an index print, whether there is a post card to be printed, the number of prints, etc.

Surface information: information relating to the designation of silk surface, gloss, etc.

Print size information: information as to the designation of a paper size.

Information concerning the number of prints ordered: information relating to the total number of prints, the number of prints in each size, the number of prints to be closed-up, the number of prints to be provided with a title, date, etc.

Ordered frame information: information concerning an instruction of a frame to be reprinted (for example, 1–40 frames).

What is Recorded in the Frame Track

Information as to the number of reprints: information concerning the number of extra prints for each frame.

Frame title information: information relating to a title of each frame.

Frame title character information: information relating to whether there is character to be printed or not, a color of a character to be printed, a position of a character to be printed, the form of a character, etc.

Information as to printing of the date and time of photographing: information relating to the date of photographing.

Close-up information: information relating to a magnification and a central position.

Print format information: information relating to the designation of each format, normal, hi-vision, and panoramic.

Up-down and right-left information: information relating to the up-down and right-left at the time of printing (the direction in which a title and the date and time are printed).

Color correction information: information concerning the designation of color correction from the user at the time of reprinting (red, dark . . . ).

The above-described information can be entered in the same way as when the automatic regeneration is performed. In the case that a different function is selected at the time of selecting a function to be saved as a new piece of magnetic information, the previous magnetic information is deleted.

For example, the function of automatic regeneration is selected and the automatic regeneration information is saved. If ordering information for a laboratory is recorded in the same film, the ordering information is written over the automatic regeneration information. As a result, the automatic regeneration information is deleted.

Therefore, in this case, the external storage device such as a flash memory is provided in the apparatus, so that the automatic regeneration information can be kept. And, it is possible to perform the automatic regeneration again for the film returned from the laboratory by reading out the automatic regeneration information from the external storage device. The automatic regeneration information can be written on the film as the magnetic information if the user hopes so.

Next, an explanation will be given of the method of setting the service by the manufacturer and the apparatus and raising the version of the apparatus.

The service, which is impossible when the apparatus comes out in the market but which is considered to be available in the near future, is included in the program. It is also possible to rewrite the program of the apparatus into a program corresponding to a new type of service. To employ the apparatus of which the version can be raised, a change-over switch is provided in the apparatus. The change-over switch is set in a predetermined side by an instruction from a manufacturer or a laboratory. As a result, the program corresponding to the new service is employed, and the apparatus judges that the change-over switch is in the predetermined side and rewrites the version management code VE to a predetermined code. In another way, when the provision of the new service can be started, the version management code on the film to be returned to the user is rewritten to a predetermined code. As a result, the employment of the new service is started at the time when the user sets the film in the apparatus.

Furthermore, following functions can be provided as functions selected by the function selection code.

This is a function for indicating that the magnetic information in the frame track is not the information concerning each frame but the information concerning the whole film. Therefore, the desired information such as the information relating to characters common to a roll of film and the address, name and telephone number of the user can be recorded in frame tracks. These pieces of information are delivered to the laboratory, so that the information relating to characters for the post card having a lot of information.

Furthermore, another function is provided so as to use a frame deleted by the user (a frame which is not displayed on the TV by the apparatus and a frame which is not ordered to be printed) or the frame track, which corresponds to the frame which has not been photographed yet, for recording other pieces of information. Then, additional pieces of information indicating whether the available track is the leader track or an optional frame track is recorded in, for example, the region behind the function selection tables FT1 and FT2. As a result, the optional information concerning a roll of film/frame which is extended or enlarged can be recorded.

Figure 10:
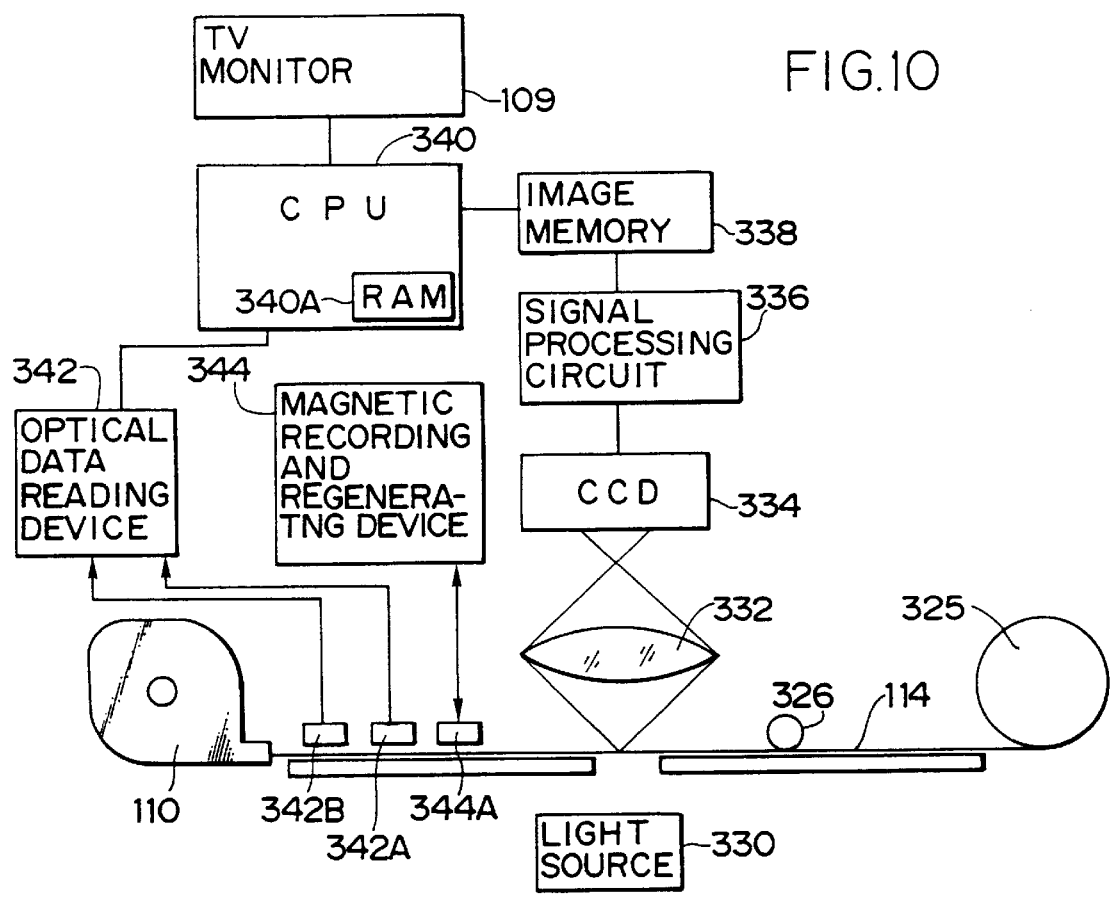
FIG. 10 is a block diagram illustrating another embodiment of the film player of FIG. 1.

FIG. 10 is a block diagram illustrating another embodiment of the film player which is shown in FIG. 1. The film player mainly comprises a light source 330, a taking lens 332, a CCD line sensor 334, a signal processing circuit 336, an image memory 338, a CPU 340, an optical data reading device 342, a device 344 for magnetic recording and regeneration and the like.

The film cartridge 110 (refer to FIG. 2) is mounted in the film supplying part of the film player. The film 114 which is fed from the film cartridge 110 is wound around the winding axis 325 of the film supplying part.

When the film image on the film 114 is picked out, and when the magnetic information is read or written in the magnetic track 114C, a capstan 326 controls the speed at which the film is conveyed. Particularly, when index image is displayed, the magnetic information is pre-scanned, and the magnetic information is written, the speed at which the film 114 is conveyed is controlled to be fixed.

A position of a perforation, which is provided on the film 114, is detected by a perforation sensor 342 in the optical data reading device 342, so that a position of each frame and each magnetic track can be specified. As a result, the film image of each frame is read, and the magnetic information is read and written at a predetermined position of the film 114.

The light source 330 illuminates the frame image on the film 114 which is fed in the feed direction, and the CCD line sensor 334 reads the image light which is transmitted through the film 114, so that the film image of a frame is read out.

The light source 330 is a long fluorescent light which is provided in the direction perpendicular to the feed direction of the film 114. It illuminates the film 114 through an infrared cutting filter (which is not shown in the drawing). The image light, which is transmitted through the film 114, is formed on a light-accepting surface of the CCD line sensor 334 through the taking lens 332 which is a fixed-focus type.

The CCD line sensor 334 is provided in the direction perpendicular to the film feed direction. The image light, which is formed on the light-accepting surface of the CCD line sensor 334, is charged for a predetermined period of time in each sensor having R, G and B filters. Then, the image light is converted into R, G and B signal charge corresponding to the light strength. The signal charge is sequentially sent to the signal processing circuit 336.

The signal-processing such as white-balance adjustment, γ-correction, etc. are carried out for the signal charge, which has been read out from the CCD line sensor 334, in the signal processing circuit 336. Then, the signal charge is converted into a video signal, which is transmitted to the TV monitor 109, and the film image of frames is displayed on the screen.

When the index image is displayed, the video signal transmitted from the signal processing circuit 336 is stored in the image memory 338. All of the film images on the film 114 are stored in the image memory 338. The film 114 has forty frames as a whole. For example, the frame images of twenty frames are read out from the image memory 338. These film images are simultaneously displayed on the screen of the monitor TV 109 which is divided into plural frames. When the screen is instructed to scroll with an input device such as the mouse, etc. to scroll up and down appropriately, the remaining 20 frames are displayed on the screen.

Furthermore, the information relating to the order for printing and the like can be designated on the index screen. The information is designated by the input device such as the mouse 120, etc. by interaction on screen, and the designated information is stored in the RAM 340A in the CPU 340. The information recorded in the RAM 340A is recorded as magnetic information at a predetermined position in a magnetic track on the film 114 when the film cartridge 110 is taken out.

The magnetic information is read and written in the magnetic track on the film 114 by the device 344 for magnetic recording and regeneration. The device 344 includes a magnetic head 344A, and reads the magnetic data recorded in the magnetic track 114C on the film 114 by means of the magnetic head 344A. The device 344 processes and transmits the magnetic data to the CPU 340 to record them in the RAM 340A. The device 344 reads the data recorded in the RAM 340A of the CPU 340 and converts them into a signal appropriate for magnetic recording, and then transmits it to the magnetic head 344A to record it in the magnetic track 114C on the film 114.

The optical data such as a bar code indicating an ID number, etc. of the film cartridge 110 is read by an optical sensor 342B which is included in the optical data reading device 342. The optical data reading device 342 processes the optical data which is detected by the optical sensor 342B and transmits them to the CPU 340.

The film player is capable of designating the information relating to the order for printing by using the index screen. That is, the information is designated by the input device such as the mouse 120, etc. and in accordance with the instruction information displayed on the screen.

There are various types of information included in the information relating to the order for printing, and the information is recorded in the leader track and the frame track according to the type of the information. In the case that there is no instruction concerning the title of the roll, the title of the frame, the number of extra prints, the up-down and right-left of the image, and the print size, the information which is recorded as the simultaneous printing information at the time of photographing is used.

After the development agency receives the film 114, on which information relating to the order to print is recorded, the extra printing is performed in accordance with the information. Normally, the film, which is ordered to be printed, is delivered from the development agency to the laboratory, so that the extra prints can be made in the laboratory. Because the print format is predetermined as mentioned above, extra printing can be performed by an automatic printing apparatus even in the development agency and the like.

FIG. 11 is a flow chart illustrating the processing procedure of the automatic printing service by an automatic printing apparatus. FIG. 12 is an external view of the automatic printing apparatus.

The user mounts the film cartridge 110 to be extra-printed in a cartridge housing part 160C in the body of the automatic printing apparatus 160 (Step S10), and instructs the body of the automatic printing apparatus 160 whether or not the information relating to the order for printing has been already recorded on the film (Step S12). It can be also considered that the body of the automatic printing apparatus 360 can automatically judges according to the magnetic information whether or not the information has been designated.

When the body of the automatic printing apparatus 360 is instructed or judges that the information concerning the order for printing is designated, it reads the print order information recorded in the magnetic track on the film (Step S14). When it is instructed or judges that the information is not designated, the information instructed with a panel 160A for ordering is entered (Step S16).

When designating the order information with the order panel 160A, it is also possible to carry out the various types of designation while looking at the image displayed on the TV monitor 160B.

A printer 170, which is connected to the body of the automatic printing apparatus 160, performs the printing according to the information concerning the order for printing which is obtained in the above-mentioned procedure (S18). The printed photograph comes out from an outlet 170A of the printer to be delivered to the user.

Next, an explanation will be given of the case when the film image is printed on a post card.

When the film image is printed on the post card, the printing of the post cards and the frame numbers of the post cards (hereafter referred to as post card information). Then, the magnetic information indicating the post card information is recorded in the leader track. The number of post cards to be printed is recorded as the information concerning the number of extra prints in the frame track corresponding to the frame number.

That is, the information concerning the number of extra prints recorded in the frame track is only used so as to indicate the number of post cards to be printed, not used to indicate the number of additional copies for a normal print paper, in the frame which is instructed to be printed in the post card in the leader track.

Normally, several additional copies are ordered for a given frame. On the other hand, in the case of post cards, the order is generally given for from dozens to several hundreds of prints. Therefore, a large capacity for recording has to be secured so as to cope with the number of post cards, in the record format in which the information concerning the number of extra prints for the post-card printing is recorded in the frame track.

That is, the information concerning the number of additional copies for the normal print paper is recorded in 7 bits, because the number of additional copies is usually less than one hundred (0–99) of two digits. On the other hand, in the case of the post-card printing, more than one hundred (three digits) prints are ordered in many cases. Therefore, the capacity of at least 10 bits is required.

Considering the above-described state, the value to be $\frac{1}{10}$ of the actually-instructed number of the post cards is recorded (by an integer) as the information concerning the number of extra prints of the frame for the post-card printing. When the post-printing is carried out, the value is read out and multiplied by 10. As a result, the number of the post cards is recorded in the same digit as the number of normal print papers. Therefore, there is no need to increase the storage capacity for the information concerning the number of the extra prints in the post-card printing.

In this embodiment, the value to be $\frac{1}{10}$ of the actually instructed number of the post cards is recorded, then the value is multiplied by 10 so as to perform the post-card printing. However, the magnification for the dividing and multiplying is not limited to "10", a voluntary magnification can be applied.

In another way, users instruct a voluntary magnification N (where "N" is an integer.). The magnification N is recorded in the leader track together with the post-card information. Then, the value indicated in the information concerning the number of the extra prints is multiplied by N so as to perform the post-card printing. That is, the number of the post-card to be actually printed, is:

(The number of the post-card)=(the number of the print for the frame to be printed)*(Magnification N in leader track).

In another way, the value in second and third figure of the number of the post-card is recorded in the leader track instead of the magnification N. Then, the value is multiplied by 100 and added to the number of the print for the frame to be printed. That is, the number of the post-card to be actually printed, is:

(The number of the post-card) =
(the value in second and third figure of the number
of the post cards) * 100 +
(the number of the print for the frame to be printed)

In the above-described way, the value in upper figures of the number of the post-card expressed in decimal system is recorded in the leader track. However, the numeration system is not limited to decimal system, other numeration system such as binary system can be applied.

As has been described above, according to the present invention, the magnetic track is divided into the leader track on the forward end part of the film and the frame track which is located after the leader part and corresponds to each frame. The manufacturer identification code including the manufacturer code which is peculiar to the manufacturer, the function selection code indicating a specific function and the like are recorded in the leader track. In each frame track, magnetic information which is determined by the manufacturer code, the function selection code and the like are recorded. Therefore, a machine or a laboratory can recognize the manufacturer and requested/provided service by reading the manufacturer identification code recorded in the leader track. As a result, they can determine whether they can cope with the magnetic information or not. If they can not, a warning is made in the machines, the service is provided in another laboratory which can cope with the magnetic information, or the film is returned to the user with the notice saying they can not provide the desired service. Moreover, each frame track is respectively used for various functions, as a result, sufficient service can be provided within the capacity of the magnetic track.

Furthermore, in another mode of the present invention, an a user enters magnetic information concerning the printing while seeing the image to be printed on the TV monitor and records magnetic information in the magnetic track. As a result, magnetic information concerning the printing can be recorded easily and without mistakes. Also, information relating to the order for printing is respectively recorded in the leader track and frame track of the film, and the extra printing is performed in accordance with the information. Therefore, the order for the printing and the extra printing can be automatically performed. Moreover, in the case of the post-card printing, the value indicating the number of prints, which is recorded in each frame track, is processed so that the value can indicates the larger number. As a result, the magnetic track of each frame track in which information concerning extra printing is recorded can be used for both ordinary extra printing and the post-card printing.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method of recording and regenerating magnetic information recorded in a magnetic track on a roll of photographic film, at least a piece of the magnetic information being automatic regeneration information used for regenerating a frame image on the photographic film on a monitor and print order information required for printing the frame image, and reading the magnetic information from the magnetic track to use the magnetic information, the method of recording and regenerating magnetic information comprising the steps of:

dividing the magnetic track into a leader track at a film leader and a frame track corresponding to each frame, which is located on the photographic film following the film leader;

during recording of the magnetic information, recording in the leader track an identification code for decoding the magnetic information, and recording in the frame track the magnetic information specified by the identification code, wherein the meaning of the magnetic information recorded in the frame track varies depending on the identification code recorded in the leader track; and during regenerating of the magnetic information, regenerating from the leader track an identification code for decoding the magnetic information, and determining whether it is possible to correctly decode the magnetic information recorded in the frame track according to the identification code, and reading the magnetic information only when determining that it is possible to correctly decode the magnetic information.

2. The method of claim 1, wherein the identification code includes a classification code indicating an apparatus number peculiar to a manufacturer and a version management code indicating a version of service.

3. The method of claim 1, further comprising the steps of:

recording in the leader track a function selection code indicating a specific function among a plurality of functions recorded in the frame track; and recording in each frame track only function parameters which correspond to a function selected by the function selection code.

4. The method of claim 3, wherein the plurality of functions recorded in the frame track include at least two functions which include a function of ordering for a laboratory, a function of automatically regenerating a film image on a TV monitor, a function of automatically printing a film image, and a function of opening a non-used frame track for recording information concerning the roll of photographic film or an individual frame.

5. The method of claim 3, wherein the function selection code is divided into a first classification and a second classification which further subdivides the first classification.

6. The method of claim 3, further comprising the steps of:

recording the function selection code and the function parameters which are recorded in the leader track and each frame, in an external recording device, so that a function changing operation can be performed by changing the function selection code; and reading out information from the external recording device to record the function selection code and the function parameters in the leader track and each frame track at a time of restoring the original function.

7. The method of claim 2 which is applied to an apparatus of which version is updated, wherein the version management code in the manufacturer code and a version of the apparatus is renewed by an operation of a switch or reading out the version management code from a film having a renewed version management code.

8. The method of claim 2, comprising the steps of:

recording in the leader track a function selection code indicating a specific function among plural functions recorded in the frame track; and recording in each frame track only function parameters which correspond to a function selected by the function selection code.

9. The method of claim 8, wherein plural functions recorded in the frame track are more than two functions among a function of ordering for a laboratory, a function of automatically regenerating a film image on a TV monitor, a function of automatically printing a film image, and a function of opening a non-used frame track for an use of recording information concerning whole of a film or voluntary frame.

10. The method of claim 8, wherein the function selection code is divided into a first classification and a second classification which further subdivides the first classification.

11. The method of claim 8, further comprising the steps of:

recording the function selection code and the function parameters which are recorded in the leader track and each frame, in an external recording device, so that a function changing operation can be performed by changing the function selection code; and reading out information from the external recording device to record the function selection code and the function parameters in the leader track and each frame track at the time of restoring the original function.

12. A method of recording and regenerating magnetic information recorded in a magnetic track on a roll of photographic film, at least a piece of the magnetic information being automatic regeneration information used for regenerating a frame image on the photographic film on a monitor and print order information required for printing the frame image, and reading the magnetic information from the magnetic track to use the magnetic information, the method of recording and regenerating magnetic information comprising the steps of:

dividing the magnetic track into a leader track at a film leader and a frame track corresponding to each frame, which is located on the photographic film following the film leader;

during recording of the magnetic information, recording in the leader track a function selection code indicating a specific function among a plurality of functions recorded in the frame track, and recording in the frame track the magnetic information specified by the function selection code, wherein the meaning of the magnetic information recorded in the frame track varies depending on the identification code recorded in the leader track;

during regenerating of the magnetic information, regenerating from the leader track a function selection code indicating a specific function among a plurality of functions recorded in the frame track, and determining whether it is possible to correctly decode the magnetic information recorded in the frame track according to the function selection code, and reading the magnetic information for use only when determining that it is possible to correctly decode the magnetic information.

13. The method of recording magnetic information of claim 12, wherein the plurality of functions include a function of automatic regeneration for reading frame images on the developed film strip on a frame-by-frame basis and displaying the read frame images on a display on a frame-by-frame basis, and a print ordering function for ordering a laboratory make prints.

14. The method of claim 13, further comprising the steps of:

reading out a film image from the photographic film;

displaying the film image on a TV monitor; and entering the function parameters while looking at a display screen of the TV monitor.

15. The method of recording the magnetic information of claim 12, further comprising the steps of:

recording, in the leader track, the function selection code for selecting the print order function;

reading frame images on the developed film strip, and displaying, on a display, an index image composed of a frame image in one frame or frame images in a plurality of frames;

while viewing the display, entering at least one piece of magnetic information among a variety of magnetic information as the function parameters relating to a title of a roll of a film, a method of printing a title of a roll, an order for special printing, a print surface, a print size, a number of prints to be ordered, a designation of a frame to be ordered, a number of extra prints, a frame title, a method of printing a frame title, a date and time of photographing, a method of printing date and time of photographing, a closing-up, a print format, a direction of an image, and a color correction; and recording the function parameter in at least one of the leader track and the frame track.

16. The method of recording the magnetic information of claim 12, further comprising the steps of:

recording, in the leader track, at least one piece of magnetic information as the function parameters determined by the manufacturer identification code, among magnetic information relating to a title of a roll of a film, a method of printing a title of a roll, an order for special printing, a print surface, a print size, a number of prints to be ordered, a designation of a frame to be ordered; and recording, in the frame track, at least one piece of magnetic information as the function parameters determined by the manufacturer identification code, among magnetic information relating to the number of extra prints, a frame title, a method of printing a frame title, a date and time of photographing, a method of printing date and time of photographing, a method of printing date and time of photographing, a closing-up, a print format, a direction of an image, and a color correction.

17. A method of recording in a magnetic track on a roll of photographic film, comprising the steps of:

dividing the magnetic track into a leader track on a forward end part of the photographic film and a frame track corresponding to each frame, which is located on the photographic film following said forward end part;

recording in the leader track information indicating an instruction for printing a film image on a post card and a frame number of a frame to be printed; and recording, in the frame track corresponding to the frame number, information which indicates a factor M relating to a number of post card prints to be printed, wherein the number of post card prints to be printed is ten times the factor M.

18. A method of recording in a magnetic track on a roll of photographic film, comprising the steps of:

dividing the magnetic track into a leader track on a forward end part of the photographic film and a frame track corresponding to each frame, which is located on the photographic film following the forward end part;

recording in the leader track information which indicates an instruction for printing a film image on a post card, a frame number of a frame to be printed and a first factor N relating to a number of post card prints to be printed; and recording, in the frame track corresponding to the frame number, information which indicates a second factor M relating to the number of post card prints to be printed, wherein the number of post card prints to be printed is the first factor N times the second factor M.

19. A method of recording in a magnetic track on a roll of photographic film, comprising the steps of:

dividing the magnetic track into a leader track on a forward end part of the photographic film and a frame track corresponding to each frame, which is located on the photographic film following the forward end part;

recording in the leader track information which indicates an instruction for printing a film image on a post card, a frame number of a frame to be printed and a first sequence of at least one digit relating to a number of post card prints to be printed; and recording, in the frame track corresponding to the frame number, information which indicates a second sequence of at least one digit relating to the number of post card prints to be printed, wherein the first sequence and the second sequence are united into a third sequence of digits and wherein the number of post card prints to be printed is represented with the third sequence of digits in a predetermined n-adic number system.

20. A method of recording magnetic information in which the magnetic information is recorded in a magnetic track on a roll of photographic film; said method comprising:

dividing the magnetic track into a leader track on a forward end part of the photographic film and a frame track corresponding to each frame, which is located on the photographic film following the forward end part;

recording a manufacturer identification code including a code specific to a manufacturer in the leader track, the manufacturer identification code determining services by using the magnetic information;

recording, in the leader track, at least one piece of magnetic information specified by the manufacturer identification code, among magnetic information relating to a title of a roll of film, a method of printing a title of a roll, an order for specific printing, a print surface, a print size, a number of prints to be ordered, and a designation of a frame to be ordered;

recording, in the frame track, at least one piece of magnetic information determined by the manufacturer identification code, among the at least one piece of magnetic information relating to the number of extra prints, a frame title, a method of printing a frame title, a date and time of photographing, a method of printing date and time of photographing, a closing-up, a print format, a direction of an image, and a color correction; and during regenerating of the magnetic information, regenerating from the leader track an identification code for decoding the magnetic information, wherein the meaning of the at least one piece of magnetic information recorded in the frame track varies depending on the manufacturer identification code recorded in the leader track and determining whether it is possible to correctly decode the magnetic information recorded in the frame track according to the identification code, and reading the magnetic information only when determining that it is possible to correctly decode the magnetic information.

21. A method of recording magnetic information in which the magnetic information is recorded in a magnetic track on a roll of photographic film, comprising the steps of:

dividing the magnetic track into a leader track on a forward end part of the photographic film and a frame track corresponding to each frame, which is located on the photographic film following the forward end part;

recording a manufacturer identification code including a code specific to a manufacturer in the leader track, the manufacturer identification code specifying service by the magnetic information;

permitting entry of at least one piece of magnetic information determined by the manufacturer identification code, among magnetic information relating to a title of a roll of a film, a method of printing a title of a roll, an order for special printing, a print surface, a print size, a number of prints to be ordered, a designation of a frame to be ordered, a number of extra prints, a frame title, a method of printing a frame title, a date and time of photographing, a method of printing date and time of photographing, a closing-up, a print format, a direction of an image, and a color correction;

reading images on the photographic film, and displaying on a display screen, an image in one frame or images in a plurality of frames;

entering the at least one piece of magnetic information while viewing the display screen;

recording the at least one piece of magnetic information in at least one of the leader track and the frame track; and during regenerating of the magnetic information, regenerating from the leader track an identification code for decoding the magnetic information, wherein the meaning of the at least one piece of magnetic information recorded in the frame track varies depending on the manufacturer identification code recorded in the leader track and determining whether it is possible to correctly decode the magnetic information recorded in the frame track according to the identification code, and reading the magnetic information only when determining that it is possible to correctly decode the magnetic information.

22. A magnetic regenerating device which records, in a magnetic track on a roll of photographic film, at least a piece of magnetic information being automatic regeneration information used for regenerating a frame image on the photographic film on a monitor wherein the magnetic track is divided into a leader track at a film leader and a frame track corresponding to each frame, which is located on the photographic film following the film leader and printing order information required for printing the frame image, and reads the magnetic information from the magnetic track to use the magnetic information, the magnetic regenerating device comprising:

recording means for recording in the leader track an identification code for decoding the magnetic information, and recording in the frame track the magnetic information specified by the identification code, wherein the meaning of the magnetic information recorded in the frame track varies depending on the identification code recorded in the leader track;

determination means for regenerating from the leader track an identification code for decoding the magnetic information, and determining whether it is possible to correctly decode the magnetic information recorded in the frame track according to the identification code; and magnetic regenerating means for reading t he magnetic information for use only when the determination means determines that it is possible to correctly decode the magnetic information.

23. A magnetic information recording device which records, in a magnetic track on a roll of photographic film, at least a piece of magnetic information being automatic regeneration information used for regenerating a frame image on the photographic film on a monitor wherein the magnetic track is divided into a leader track at a film leader and a frame track corresponding to each frame, which is located on the photographic film following the film leader; and print order information required for printing the frame image, and reads the magnetic information from the magnetic track to use the magnetic information, the recording device recording in the leader track an identification code for decoding the magnetic information, and recording in the frame track the magnetic information specified by the identification code, wherein the meaning of the magnetic information recorded in the frame track varies depending on the identification code recorded in the leader track.

24. A magnetic information regenerating device which uses a roll of photographic film which records, in a magnetic track thereon, at least a piece of magnetic information being automatic regeneration information used for regenerating a frame image on the photographic film on a monitor wherein the magnetic track on said photographic film, which is divided into a leader track at a film leader and a frame track corresponding to each frame, which is located on the photographic film following the film leader, the leader track containing an identification code for decoding the magnetic information, and the frame track containing the magnetic information specified by the identification code and print order information required for printing the frame image, and reads the magnetic information from the magnetic track to use the magnetic information, the magnetic regenerating device comprising:

determination means for regenerating the identification code from the leader track when the magnetic information is regenerated, and determining whether it is possible to correctly decode the magnetic information recorded in the frame track according to the identification code, wherein the meaning of the magnetic information recorded in the frame track varies depending on the identification code recorded in the leader track; and magnetic regenerating means for reading the magnetic information for use only when the determination means determines that it is possible to correctly decode the magnetic information.

25. A roll of photographic film having a magnetic track thereon, in which magnetic information is recorded in a magnetic track, wherein:

the magnetic information is at least a piece of information among automatic regeneration information used for regenerating a frame image on the photographic film on a monitor and print order information required for printing the frame image;

the magnetic track is divided into a leader track at a film leader and a frame track corresponding to each frame, which is located on the photographic film following the film leader; and an identification code for decoding the magnetic information is recorded in the leader track, and the magnetic information specified by the identification code is recorded in the frame track, wherein the meaning of the magnetic information recorded in the frame track varies depending on the identification code recorded in the leader track.

* * * * *